United States Patent
Kumada

[11] 3,923,379
[45] Dec. 2, 1975

[54] LIGHT CONTROL ELEMENT HAVING A WIDE VIEWING ANGLE

[75] Inventor: Akio Kumada, Kokubunji, Japan

[73] Assignee: Hitachi, Ltd., Japan

[22] Filed: July 30, 1974

[21] Appl. No.: 493,103

[30] Foreign Application Priority Data
July 30, 1973 Japan............................. 48-84907

[52] U.S. Cl................................. 350/150; 350/157
[51] Int. Cl.² ........................................... G02F 1/03
[58] Field of Search..................................... 350/150

[56] References Cited
UNITED STATES PATENTS

| | | | |
|---|---|---|---|
| 2,705,903 | 4/1955 | Marshall | 350/150 |
| 2,768,557 | 10/1956 | Bond | 350/150 |
| 3,838,906 | 10/1974 | Kumada | 350/150 |

*Primary Examiner*—John K. Corbin
*Attorney, Agent, or Firm*—Craig & Antonelli

[57] ABSTRACT

A light control element having a wide viewing angle includes two biaxial electro-optic crystal plates having thicknesses of retardations equal to each other, and resulting in an equivalent uniaxial crystal plate, and a uniaxial crystal plate conjugate to the electro-optic crystal plates and having a thickness of the equivalent uniaxial retardation of the biaxial electro-optic crystal plate arrayed in cascade in the direction of light incidence. The anisotropy of the biaxial electro-optic crystal is perfectly compensated not only for normally incident light but also for obliquely incident light.

11 Claims, 7 Drawing Figures

LIGHT CONTROL ELEMENT HAVING A WIDE VIEWING ANGLE

BACKGROUND OF THE INVENTION

1. Field of the Invention

The present invention relates to a light control element which accurately controls light transmission not only for normally incident light but also for obliquely incident light.

The term "light control element" is a general term for elements which control, in response to an input signal, the intensity, color, wavelength, phase, vibrational plane and phase difference of light permeating therethrough. Accordingly, the so-called optical switch, light intensity modulator, color modulator, polarization plane switching element, etc. are all included within the meaning of the term "light control element."

1. Description of the Prior Art

As a light control element employing the electro-optic effect, a Kerr cell has heretofore been known. A Kerr cell typically includes a nitrobenzene contained in a glass vessel. A voltage of several tens of kV is applied through electrodes immersed in the liquid. When employing a Kerr cell for a light control device, the Kerr cell is inserted between a pair of polarizers the polarization planes of which are arranged orthogonally to each other. They are arranged in cascade so that linearly polarized light transmitted through one polarizer may be transmitted through the Kerr cell (in other words, the light control element) and so that the light transmitted through the Kerr cell may reach the other polarizer. In this light control device, with no voltage applied, the nitrobenzene is optically isotropic. Therefore, the linearly polarized light transmitted through one polarizer passes through the Kerr cell without suffering any loss in the quantity of transmitted light. Since, however, it is intercepted by the other polarizer (namely, an analyzer), the quantity of transmitted light is zero.

On the other hand, when a voltage is applied to the nitrobenzene, it becomes birefringent. The linearly polarized light incident on the Kerr cell causes a phase difference between birefringent light beams during the transmission through the Kerr cell, and generally becomes elliptically polarized light after transmission through the Kerr cell. Consequently, with a voltage applied to the Kerr cell, the quantity of light permeating through the analyzer is not zero, but a considerable amount of linearly polarized light permeates therethrough. The quantity of the permeating linear polarization varies in dependence on the magnitude of the applied voltage of the Kerr cell. It is the largest at an appropriate magnitude, that is, at such a voltage that the vibrational plane of the incident linear polarization rotates by 90° (this voltage is called the half-wave voltage). The phase difference between the birefringent light beams transmitted through the Kerr cell with the voltage applied thereto is proportional to an optical path difference R which is determined by the product of the birefringence $\Delta n$ due to the electro-optic effect (the difference in the refractive index between the birefringent light beams) and the distance $d$ over which the light passes through the cell for normal incidence (letting $\lambda$ denote the wavelength of the transmitted light, the phase difference $= (2\pi/\lambda) \Delta n \cdot d$). Accordingly, where the incident light is not collimated light but it is divergent light or convergent light, the optical path length and the birefringence also differ from those in the case of normal incidence (collimated), and hence, the quantity of transmitted light varies in dependence on the magnitude of the angle of divergence or convergence. For this reason, even when the light control element is designed so as to accurately operate for normally incident light, it does not always operate accurately for obliquely incident light.

A particular problem in the light control element is the existence of light noise in the "off" state. In this respect, when the nitrobenzene solution is used as in the Kerr cell, no light leaks in the "off" state due to the optical isotropy property.

Since, however, the electro-optic effect of the nitrobenzene solution is not very great, a very high voltage is required in order to operate it as a light control element. To decrease the operating voltage, a different substance must be selected. The following Table 1 lists typical electro-optic crystals and their crystallographic symmetries, linear electro-optic coefficients (Pockels coefficients), refractive indices and half-wave voltages.

TABLE 1

| crystal | symmetry | linear electrooptic coefficient ×10⁻¹² (m/V) | refractive index | half-wave voltage (Vλ/2) (kV) | direction of electric field | direction of incident light |
|---|---|---|---|---|---|---|
| CuCl | 43m | $\Gamma_{41}{}^{(\gamma)} = 6.1$ | $n_o=1.996$ ($\lambda=0.535\mu$) | 5.8 ($\lambda=20.5\mu$) | [001] | [001] |
| CuBr | 43m | $\Gamma_{41}{}^{(\gamma)} = 0.85$ | $n_o=2.16$ ($\lambda=0.535\mu$) | 32.1 ($\lambda=0.5\mu$) | [001] | [001] |
| ZnTe | 43m | $\Gamma_{41}{}^{(\gamma)} = 4.55$ | $n_o=3.1$ ($\lambda=0.57\mu$) | 3.4 ($\lambda=0.6\mu$) | [001] | [001] |
| ZnSe | 43m | $\Gamma_{41}{}^{(\gamma)} = 2.0$ | $n_o=2.66$ ($\lambda=0.5\mu$) | 7.8 ($\lambda=0.5\mu$) | [001] | [001] |
| ZnS | 43m | $\Gamma_{41}{}^{(\gamma)} = 1.2$ ($\Gamma=0.45\mu$) $\Gamma_{41}{}^{(\gamma)} = 2.0 \sim 2.1$ ($\Gamma=0.6\mu$) | $n_o=2.471$ ($\lambda=0.4\mu$) $n_o=2.364$ ($\lambda=0.6\mu$) | 10.4 ($\lambda=0.45\mu$) | [001] | [001] |
| GaAs | 43m | $\Gamma_{41}{}^{(\gamma)} = 0.27 \sim 1.2$ ($\lambda=1 \sim 1.8\mu$) | $n_o=3.60$ ($\lambda=0.90\mu$) $n_o=3.42$ ($\lambda=1.25\mu$) | 13.3 ($\lambda=1\mu$) | [001] | [001] |
| GaP | 43m | $\Gamma_{41}{}^{(S)} = 1.06$ | $n_o=3.315$ ($\lambda=0.6\mu$) | 7.6 ($\lambda=0.54\mu$) | [001] | [001] |
| N₄(CH₂)₆ | 43m | $\Gamma_{41}{}^{(\gamma)} = 4.2$ | $n_o=1.59$ ($\lambda=0.6\mu$) | 1.5 ($\lambda=0.6\mu$) | [001] | [001] |
| Bi₄(Geo₄)₃ | 43m | $\Gamma_{41}{}^{(\gamma)} = 1.03$ | $n_o=2.1$ | 2.7 | [001] | [001] |

TABLE 1-continued

| crystal | | symmetry | linear electrooptic coefficient $\times 10^{-12}$ (m/V) | refractive index | half-wave voltage $V\lambda/2$ (kV) | direction of electric field | direction of incident light |
|---|---|---|---|---|---|---|---|
| $KH_2PO_4$ (KDP) | | $\bar{4}2m$ | $\Gamma_{41}^{(T)}=8.6$<br>$\Gamma_{63}^{(T)}=-10.5$<br>$\Gamma_{63}^{(S)}=-9.7$ | ($\lambda=0.6\mu$)<br>$n_o=1.51$<br>$n_e=1.47$<br>($\lambda=0.546\mu$) | ($\lambda=0.6\mu$)<br>7.5<br>($\lambda=0.5\mu$) | [001] | [001] |
| $KD_2PO_4$ (DKDP)<br>[90% converted] | | $\bar{4}2m$ | $\Gamma_{41}^{(T)}=8.8$<br>$\Gamma_{63}^{(T)}=26.4$ | $n_o=1.51$<br>$n_e=1.47$<br>($\lambda=0.546\mu$) | 3.0<br>($\lambda=0.5\mu$) | [001] | [001] |
| $NH_4H_2PO_4$ (ADP) | | $\bar{4}2m$ | $\Gamma_{41}^{(T)}=24.5$<br>$\Gamma_{63}^{(T)}=-8.5$<br>$\Gamma_{63}^{(S)}=-5.5$ | $n_o=1.53$<br>$n_e=1.48$<br>($\lambda=0.546\mu$) | 9.0<br>($\lambda=0.5\mu$) | [001] | [001] |
| $KH_2AsO_4$ (KDA) | | $\bar{4}2m$ | $\Gamma_{41}^{(T)}=12.5$<br>$\Gamma_{63}^{(T)}=10.9$ | $n_o=1.57$<br>$n_e=1.52$<br>($\lambda=0.546\mu$) | 6.4<br>($\lambda=0.5\mu$) | [001] | [001] |
| $RbH_2AsO_4$ (RDA) | | $\bar{4}2m$ | $\Gamma_{63}^{(T)}=13.0$ | $n_o=1.56$<br>$n_e=1.52$<br>($\lambda=0.546\mu$) | | | |
| $BaTiO_3$<br>[T < Tc] | | 4mm | $\Gamma_{42}^{(T)}=1640$<br>$\Gamma_{42}^{(S)}=820$<br>$(\Gamma_{33}-\Gamma_{13})^{(T)}=108$ | $n_o=2.44$<br>$n_e=2.37$<br>($\lambda=0.546\mu$) | 0.4<br>($l/d$)=1 | [001] | [001] |
| $KTa_{0.65}Nb_{0.35}O_3$<br>[KTN]<br>[T < Tc] | | 4mm | $(\Gamma_{33}-\Gamma_{13})^{(T)}=500$<br>$\Gamma_{42}^{(T)}=16000$ | $n_o=2.318$<br>$n_e=2.27$<br>($\lambda=0.546\mu$) | 0.11<br>($l/d$)=1 | [001] | [001] |
| $K_{0.6}Li_{0.4}NbO_3$ | | 4mm | $(n_e^3\Gamma_{33}-n_o^3\Gamma_{13})^{(T)}$<br>$=680$ | $n_o=2.277$<br>$n_e=2.163$<br>($\Gamma=0.633\mu$) | 0.93<br>($l/d$)=1 | [001] | [001] |
| $KSr_2NbO_{15}$ | | 4mm | $\left\{\Gamma_{33}-\left(\dfrac{n_o}{n_e}\right)^3\Gamma_{13}\right\}^{(T)}$<br>$=130$ | $n_o\cong n_e$<br>$=2.25$<br>($\lambda=0.633\mu$) | 0.43<br>($l/d$)=1 | [001] | [001] |
| $Br_xBa_{(1-x)}Nb_2O_6$<br>$0<x<1$ | x=0.75 | 4mm | $(\Gamma_{33}-\Gamma_{13})^{(S)}$<br>$=1070$ | $n_o=2.3117$<br>$n_e=2.2987$<br>($\lambda=0.633\mu$) | 0.048<br>($l/d$)=1 | [001] | [010] |
| $Br_xBa_{(1-x)}Nb_2O_6$<br>$0<x<1$ | x=0.50 | 4mm | $(\Gamma_{33}-\Gamma_{13})^{(S)}$<br>$=90$ | $n_o=2.3123$<br>$n_e=2.2734$<br>($\Gamma=0.633\mu$) | 0.58<br>($l/d=1$) | [001] | [010] |
| $Br_xBa_{(1-x)}Nb_2O_6$<br>$0<x<1$ | 4=0.25 | 4mm | $(\Gamma_{33}-\Gamma_{13})^{(S)}$<br>$=41$ | $n_o=2.3144$<br>$n_e=2.2596$<br>($\lambda=0.633\ \mu$) | 1.24<br>($l/d=10$) | [001] | [010] |
| $Ba_2NaNb_5O_{15}$ | | 4mm | $(n_e^3\Gamma_{33}-n_o^3\Gamma_{13})$<br>$=370$ | $n_o=2.32$<br>$n_e=2.22$<br>($\lambda=0.633\mu$) | 1.72<br>($l/d=1$) | [001] | [010] |
| $LiNbO_3$ | | 3m | $\Gamma_{13}^{(S)}=8.6$<br>$\Gamma_{33}^{(S)}=30.8$<br>$\Gamma_{51}^{(S)}=43^{(S)}=28$<br>$\Gamma_{22}^{(S)}=34$<br>$\Gamma_{22}^{(T)}=7$ | $n_o=2.286$<br>$n_e=2.200$<br>($\lambda=0.633\mu$) | 2.9<br>($l/d=1$) | [001] | [100] |
| $LiTaO_3$ | | 3m | $\Gamma_{13}=7$<br>$\Gamma_{33}^{(S)}=303$<br>$\Gamma_{51}^{(S)}=\Gamma_{42}^{(S)}=20$ | $n_o=2.176$<br>$n_e=2.180$<br>($\lambda=0.633\mu$) | 2.8<br>($l/d=1$) | [001] | [100] |

In the above Table 1, the values for which no temperature is particularly specified are those at room temperature. The symbol (S) indicates a value at a constant strain, and (T) a value at a constant stress.

Values on which no wavelength is particularly indicated are those for $\lambda = 0.5 - 0.6\ \mu$. In crystals with no wavelength indicated, the values are almost constant in $0.5 - 0.6\ \mu$.

The half-wave voltage of each crystal differs in value in dependence on the applied voltage and the direction of incident light.

Character $l$ denotes the length of a crystal in the direction of light propagation, and $d$ the thickness between electric field electrodes of the crystal.

Among the crystals in the above table, those whise can turn the element "off" independently of the angle of incidence on the electro-optic crystal are cubic crystals (isotropic) belonging to the group $\bar{4}3m$ (where $\bar{4}$ represents the 4-fold axis of rotatory reflection, 3 the 3-fold axis of symmetry and $m$ the mirror plane (or reflection plane)). In order to turn the element "on" in the visible region, the half-wave voltage $V(\lambda/2)$ to be applied to the electro-optic crystal must be about 10 kV, which is comparatively high.

The electro-optic effect of crystals exhibiting ferroelectricity is relatively great, and the half-wave voltage thereof is low. For example, the group $KH_2PO_4$ of $\bar{4}2m$ (where $\bar{4}$ denotes the 4-fold axis of rotatory reflection, 2 the 2-fold axis of symmetry and $m$ the mirror plane) includes $KD_2PO_4$ of a half-wave voltage $V(\lambda/2) = 3$ kV, and the group $LiNbO_3$ of 3m (where 3 indicates the 3-fold axis of symmetry and $m$ the mirror plane) includes $LiNbO_3$ of $V(\lambda/2) = 2.9$ kV, $LiTaO_3$ of $V(\lambda/2) = 2.8$ kV, etc. For all these substances, large-sized crystals which are comparatively homogeneous are easily obtained, and the electro-optic effect is readily attained. They are, therefore, utilized as electro-optic crystals.

The group 4mm (where 4 designates the 4-fold axis of symmetry and mm denotes two mirror planes) represented by $BaTiO_3$ includes substances which have a still greater electro-optic effect. For example, $V(\lambda/2) = 0.4$ kV in $BaTiO_3$. When a solid solution is prepared, one having an even lower $V(\lambda/2)$ is obtained, and $V(\lambda/2)$ is 0.048 kV in $Sr_{75}Ba_{25}Nb_2O_6$. In this group, however, optical large crystals are difficult to produce, and the stage of practical use has not yet been reached. Development is presently concentrated on the technique of growing homogeneous large-sized crystals.

The family KDP of $\overline{4}2m$, the family LiNbO$_3$ of 3m, the family BaTiO$_3$ of 4 mm, etc. which have a relatively great electro-optic effect are all uniaxial crystals. With these crystals, the leakage of light upon light interception depends greatly upon the angle of incidence, unlike the case of the cubic crystals.

In addition to the cubic (or equi-axes) crystals and the uniaxial crystals described above, biaxial crystals such as Gd$_2$(MoO$_4$)$_3$ have recently been developed as electro-optic crystals (Gd$_2$(MoO$_4$)$_3$ is biaxial only at temperatures below 160°C.).

Gd$_2$(MoO$_4$)$_3$ and crystals of the same family have memory action with respect to birefringence $\Delta n$ at temperatures below the Curie point. Unless a voltage exceeding a threshold value is applied, they retain the birefringence $\Delta n$ permanently even when any voltage below the threshold value is applied. By utilizing this property, a light control element having the memory action can be produced.

A c-plate 387 $\mu$ thick, which is obtained by slicing a single crystal of the family Gd$_2$(MoO$_4$)$_3$ along the c-plane of the crystal or normally to the bisector of the two optical axes and by polishing the cut piece, acts as a $\lambda/4$ plate. When transparent electrodes are provided on the upper and lower surfaces of the c-plate and a voltage of about 200 volts is applied, the sign of birefringence changes. Therefore, when the $\lambda/4$ plate is diagonally placed on another $\lambda/4$ plate, the retardation $\gamma$ of light for these $\lambda/4$ plates becomes $\gamma = \frac{1}{4} \pm \frac{1}{4} = \frac{1}{2}$ or 0. By combining these plates with polarizers, an optical shutter for monochromatic light can be constructed. Where the incident light is white light, the c-plates are constructed into $\lambda/4$ plates for its center wavelength $\lambda_o = 535$ m$\mu$. Then, the transmitted light is scarcely colored, and light interception can be affected irrespective of the wavelengths. Where the $\lambda/4$ plate combined with the single Gd$_2$(MoO$_4$)$_3$ crystal is replaced with a phase retarder having a large retardtion R, more specifically where a quartz crystal x-plate approximately 100 $\mu$ thick is used, where two Gd$_2$(MoO$_4$)$_3$ c-plates 210 $\mu$ and 190 $\mu$ thick are placed thereon and where they are diagonally located between two polarizers, the total retardation $\gamma$ becomes great and an interference color appears. When, similar to the optical shutter element, voltage of about 150 volts are respectively applied to the two crystal plates, the total retardation $\gamma$ varies as in the following equation:

$$\gamma = \gamma_o \pm \gamma_I \pm \gamma_{II}$$

where $\gamma_o$, $\gamma_I$ and $\gamma_{II}$ indicate the values of retardation of the quartz crystal, the Gd$_2$(MoO$_4$)$_3$ crystal I and the like crystal II, respectively. As a result, the total retardations $\gamma$ become 950 m$\mu$, 1113 m$\mu$ and 1313 m$\mu$. When retardations 950 m$\mu$, 1138 m$\mu$ and 1313 m$\mu$ at which the interference colors become red, blue and green are employed, a color modulator which changes the color of transmitted light in response to voltage application is obtained.

Where light is incident at an acute angle (not parallel) to the c-axial direction of the Gd$_2$(MoO$_4$)$_3$ crystal plate, the amount of leakage light increases and the contrast ratio between "on" and "off" decreases in the optical shutter, while the saturation of the color changes and, moreover, another color sometimes appears in the light control element for color modulation.

When using Gd$_2$(MoO$_4$)$_3$ for the electro-optic element, accordingly, the angle of incidence is subject to limitations as in the case of the family KH$_2$PO$_4$, the family BaTiO$_3$ and the family LiNbO$_3$ described above, and it is about 3° or so.

As is stated above, for cubic electro-optic crystals, no leakage light appears in the "off" state, but the electro-optic effect upon voltage application is small. With crystals having a great electro-optic effect, both the uniaxial and biaxial crystals are disadvantageous from the point of tolerance (wide viewing angle property) for obliquely incident light. In an image processor such as a conventional camera, an angle of field of at least about $\pm 30°$ is required.

One solution to providing a wide viewing angle is disclosed in applicant's application U.S. Pat. No. 3,838,906, entitled "Optical Switch." The invention disclosed in this application is constructed as follows. As shown in FIG. 1 of the drawings of the present application, an electro-optic crystal plate 3 and a biaxial crystal plate as a compensator 6 are disposed in cascade between a polarizer 1 and an analyzer 2 whose polarization planes are arranged orthogonally to each other. The electro-optic crystal plate 3 is constructed in such way that, in a biaxial crystal plate (or a uniaxial crystal plate) whose opposing upper and lower major surfaces are respectively formed to be normal to the bisector of an angle defined by the two optical axes (or to be normal to the single optical axis in the case of the uniaxial crystal plate), transparent electrodes 4 are provided on the respective principle planes, and a voltage source 5 is connected across the transparent electrodes. For the electro-optic crystal plate 3 and the compensator 6, crystals which are conjugate and in compensating relation with respect to their optical polarities must be selected. That is, in correspondence with the positive or negative birefringence of the electro-optic crystal plate, an optically negative or positive crystal plate must be selected as the compensator.

For an electro-optic crystal plate and compensator, satisfying the above relation, arranged in cascade between the polarizer and the analyzer as crossed polarizers, where the incident light on such an electro-optic crystal plate is oblique to the normal of the principal plane of the crystal plate, the phase difference of transmitted light corresponding to a variation of the refractive index dependent upon the angle of inclination of the incident light can be compensated. In this previous invention, the conditions for selecting the substance of the electro-optic crystal plate are specified. Further, gadolinium molybdate (Gd$_2$(MoO$_4$)$_3$ is an example and is explained in detail. Since Gd$_2$(MoO$_4$)$_3$ is a biaxial positive crystal, the compensator crystal must be a biaxial negative crystal. Among biaxial negative crystals, KNO$_3$Ba(OH)$_2$.8H$_2$O, Na$_2$ZrSrO$_5$, CoSeO$_4$.6H$_2$O, ZnSO$_4$SrCO$_3$, CaCO$_3$, BaCO$_3$ and PbCO$_3$ are listed as substances which are suited for an optimum compensating condition for widening the viewing angle, considering their optical properties. Here, the optimum condition is that both the following relations hold as to the angle of optical axes $2x\overline{V}_2$ the birefringence $\Delta n_2$, and the thickness $d_2$ of the biaxial substance:

$$v_1.n_1 = v_2.n_2$$
$$\Delta n_1.d_1 = \Delta n_2.d_2 \qquad (1)$$

where, subscripts 1 and 2 correspond to the electro-optic crystal (in this case, Gd$_2$(MoO$_4$)$_3$) and the compensator crystal (in this case, biaxial negative crystal), respectively; n denotes the refractive index.

However, it is extremely difficult to provide a substance which accurately fulfills the condition (1). Substances which approximately satisfy it have been utilized. In that case, a variation from the condition (1) has become the limit of the compensation, i.e., the limit of the widening of the viewing angle as it is. It has been impossible to obtain a true widening of the viewing angle.

SUMMARY OF THE INVENTION

In order to provide a wide viewing angle in a light control element, the present invention uses a biaxial crystal plate in which the opposing upper and lower major surfaces of a biaxial crystal are respectively formed so as to be normal to the bisector of an angle defined by two optical axes, and a uniaxial crystal plate in which the opposing upper and lower major surfaces of a uniaxial crystal are respectively formed so as to be normal to the optical axis.

An object of the present invention is to provide a light control element which is free from the disadvantage of the prior-art light control element and whose angle of view is made wide.

The subject matter of the present invention resides in that two biaxial electro-optic crystal plates and a uniaxial crystal plate are successively arranged in cascade between a pair of polarizers, each of the biaxial electro-optic crystal plates having its upper and lower opposite major surfaces formed so as to be respectively normal to the bisector of an angle defined between the two optical axes, the biaxial plates having their thicknesses between the major surfaces made so as to possess equal retardations. The uniaxial crystal plate possesses a retardation twice as large as that of the biaxial electro-optic crystal plate and transparent electrodes are respectively disposed on the upper and lower major surfaces of one of the biaxial electro-optic crystal plates. A voltage supply source for modulating the retardation of the crystal plate to a predetermined value is connected to the transparent electrodes. The two biaxial electro-optic crystal plates in the light control element of this construction must have their crystal orientations disposed so as to cancel the retardations of the crystal plates of each other (more specifically, the upper and lower major surfaces of the respective crystal plates must be arranged with orientations which are rotated by 90° with respect to the normal axis).

DETAILED DESCRIPTION OF THE DRAWINGS

Figure 1:
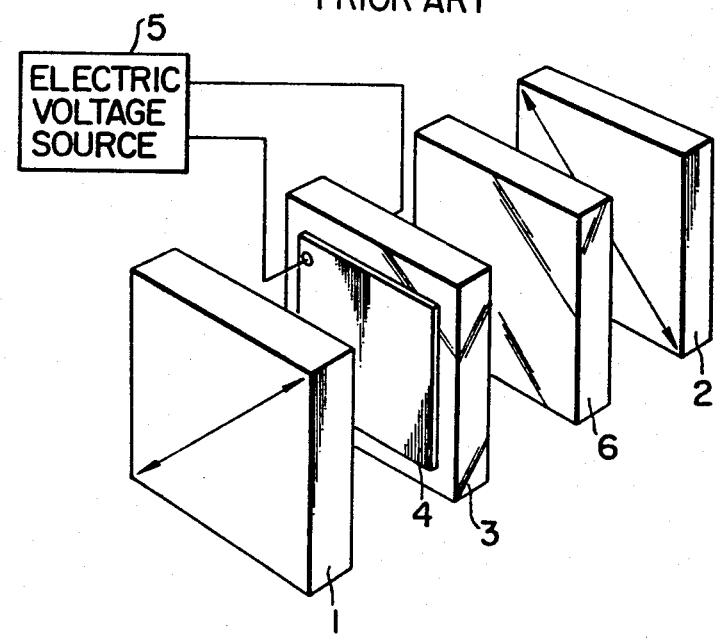
Figure 2:
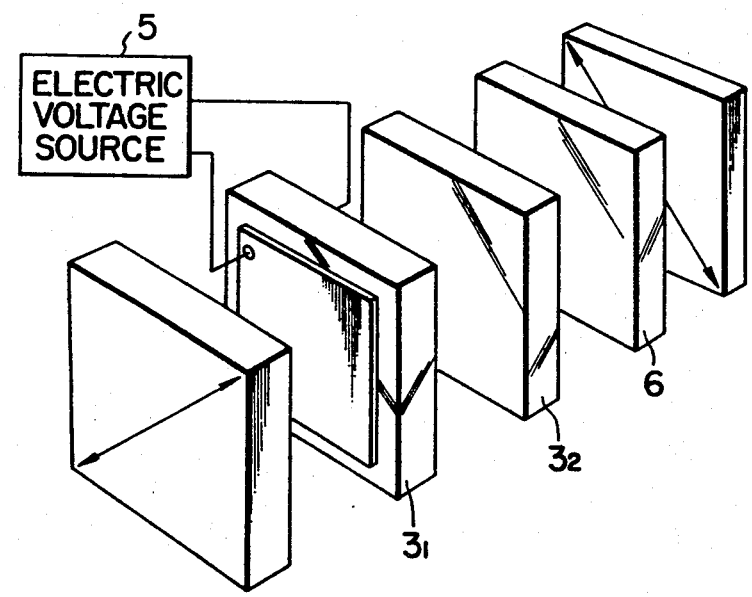
Figure 3:
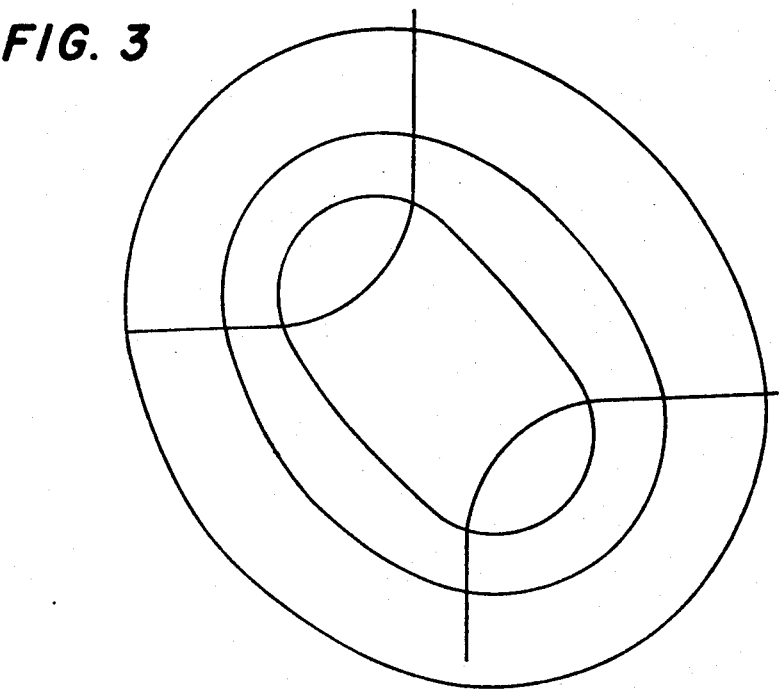
Figure 4:
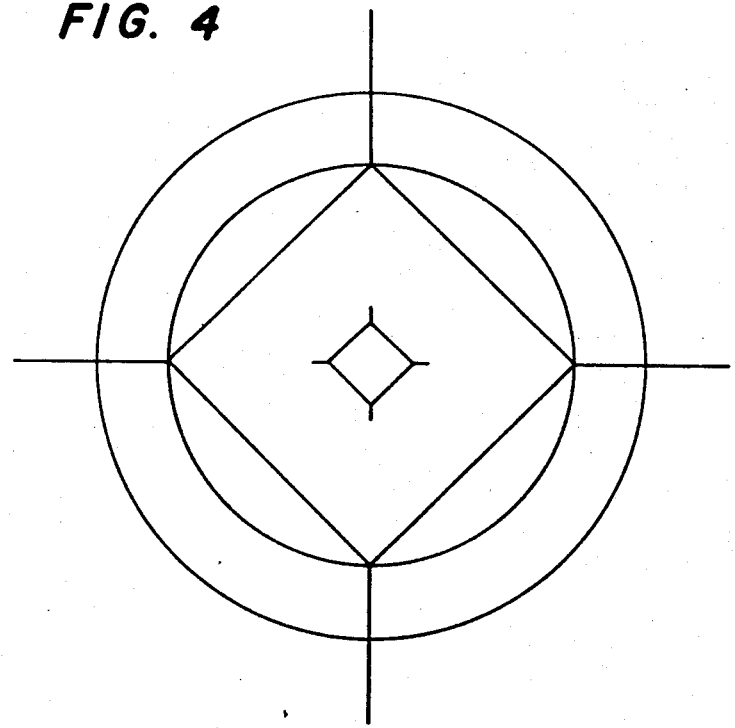

FIG. 1 is a perspective view showing the construction of a prior-art light control device which employs a biaxial crystal plate, FIG. 2 is a perspective view showing the construction of a light control element of the present invention, FIG. 3 is a conoscopic figure at the time when two λ/4 plates are arranged in a phase adding manner, FIG. 4 is a conoscopic figure at the time when the two λ/4 plates are arranged in a phase subtracting manner.

Figure 5:
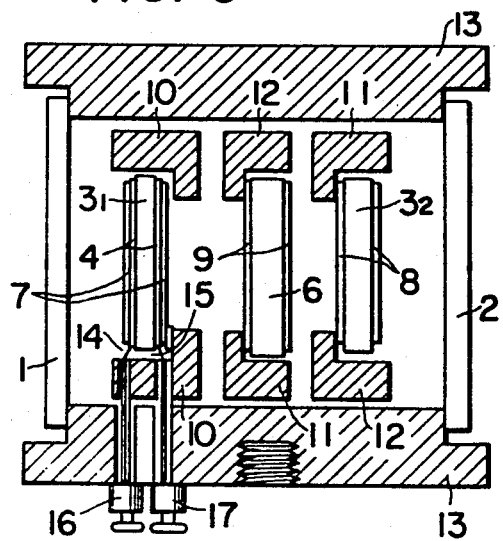
Figure 7:
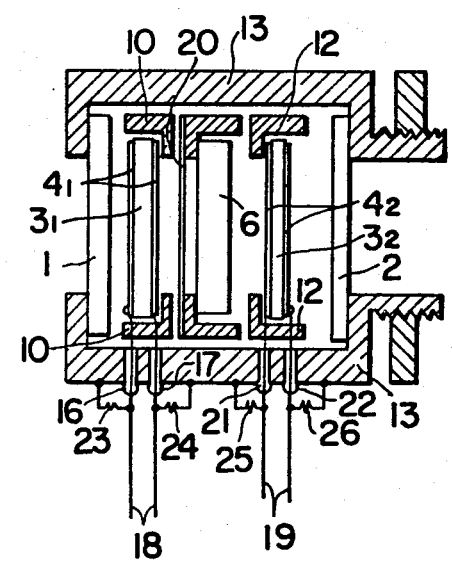
Figure 6:
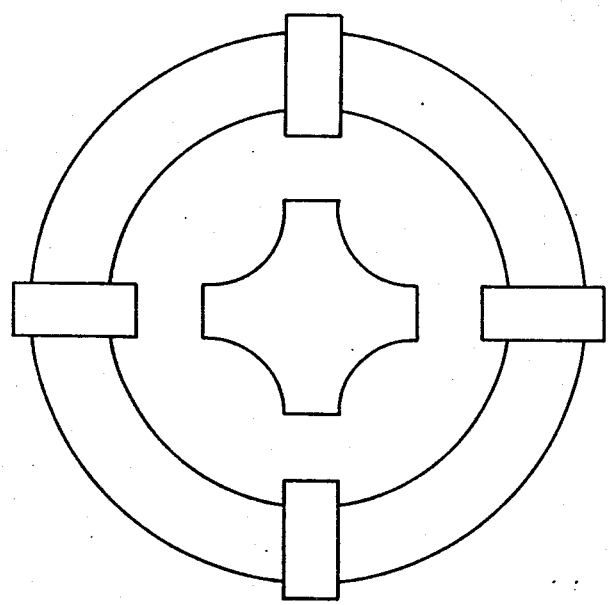

FIG. 5 is a vertical sectional view of an optical shutter element which is constructed on the basis of the principle of the present invention and which has the angle of view widened for He - Ne laser light rays, FIG. 6 is a conoscopic figure for the light interception of an optical shutter element for the He - Ne laser light where $KH_2PO_4$ is used as a conjugate crystal, and FIG. 7 is a vertical sectional view of a color modulator having a wide viewing angle according to the present invention which can control the three primary colors of red, green and blue.

DETAILED DESCRIPTION

With the prior-art light control element or the light control element disclosed in U.S. Application Ser. No. 289,255, where the biaxial birefringent crystal plates are used for the respective crystal plates constituting the element, a deviation of birefringence occurs for the light obliquely incident on the element. Moreover, no ideal substance can be selected as the materiaal being compensated the deviation of birefringence. This creates a problem in putting the light control element into practical use. The present invention has been made in order to eliminate such a difficulty of the selection of the material in the light control element.

More specifically, with respect to the light control element disclosed in U.S. Application Ser. No. 289,255 (Dutch Application No. 7,212,572), the present invention compensates equivalently the biaxial anisotropy of the consituent biaxial electro-optic crystal plate into uniaxial anisotropy (hereinbelow, a plate for compensating the biaxial anisotropy of the electro-optic crystal plate into uniaxial anisotropy in this manner will be termed the "equivalent uniaxial plate"), and further makes compensation by the use of a uniaxial plate which is optically conjugate to the equivalent uniaxial plate. In other words, the light control element of the present invention is characterized by depriving the constituent biaxial electro-optic crystal plate of its optical anisotropy and using it as an optical isotropic body. When this principle of construction is applied to a device such as an optical shutter, no birefringence is exhibited for illuminating light in any direction when the device is in the optical isotropic state. The incident light, for example, is intercepted perfectly by the polarizer and analyzer diagonally arranged with the $Gd_2(MoO_4)_3$ crystal plate held therebetween, so that the shutter is in the "off" state. In this case, first of all, the biaxial anistropy of the $Gd_2(MoO_4)_3$ crystal plate must be compensated so as to become equivalent to perfect uniaxiality. A method therefor is very simple.

Two C-plates, each of which has two upper and lower major surfaces normal to the bisector of the two optical axes of a $Gd_2(MoO_4)_3$ crystal, may be finished to equal thicknesses and may be arranged in such a manner that the retardations of the crystal plates are reduced from each other. At this time, the biaxiality of the $Gd_2(MoO_4)_3$ crystal plate is cancelled, a uniaxiality that $n_o = - n_a n_b/2$ and that $n_e = n_c$ is exhibited. Therefore, when the crystal plate and a crystal plate having two upper and lower major surfaces formed normally to the optical axis of a uniaxial crystal in conjugate relationship are arrayed diagonally to each other and in cascade, the uniaxial anisotropy is cancelled and the optically isotropic body can be obtained.

Subsequently, for the arrangement of the two $Gd_2(MoO_4)_3$ plates and the one conjugate uniaxial crystal plate, the polarization of one of the two $Gd_2(MoO_4)_3$ crystal plates is reversed. At this time, the optical anisotropies of the two $Gd_2(MoO_4)_3$ plates change from the previous, phase-subtracting arrangement to the phase-adding arrangement. Therefore, the birefringence is exhibited even for normally incident light, and the optical shutter is in the "on" state.

The ideal electro-optic shutter utilizing birefringence must be in the "on" state as a half-wave plate for light incident in all directions, and be in the "off" state as an isotropic body with no birefringence for light incident in all directions. It will now be explained that such an ideal optical shutter can be constructed by the use of $Gd_2(MoO_4)_3$.

$Gd_2(MoO_4)_3$ is a biaxial positive crystal, which has the following refractive indices (the wavelength for measurements $\lambda$ is 546 m$\mu$):

$n_c = 1.901$  $n_a \approx n_b = 1.848$
$n_c - n_a = 5.3 \times 10^{-2}$  $n_a - n_b = 4.0 \times 10^{-4}$ Two $\lambda/4$ plates of a thickness of $d$ mm made of c-plates of the single $Gd_2(MoO_4)_3$ crystal are diagonally arranged between two crossed polarizers. When the birefringences of the two $\lambda/4$ plates of $Gd_2(MoO_4)_3$ are subtracted from each other, the phase differences for the normally incident light beams are cancelled by the two and become zero. As stated above, the two $\lambda/4$ plates of $Gd_2(MoO_4)_3$ are equivalent to a uniaxial crystal of $n_e = 1.901$ and $n_o = 1.848$ in this state.

Now consider the retardation $\gamma=(2\pi/\lambda)d \Delta n$ ($\Delta n$ denotes the birefringence difference) for light incident on these crystals in various directions. Light rays incident at an angle $\theta_o$ to the normal of the $\lambda/4$ plates of $Gd_2(MoO_4)_3$ are refracted within the crystal plates, and transmitted at an angle $\theta_i$. Here $\theta_o$ and $\theta_i$ are represented by the following equation:

$$\sin \theta_o = 1.85 \sin \theta_i \quad (2)$$

The apparent thickness $d_i$ of the crystal plate for the light beams permeating at the angle $\theta_i$ becomes:

$$d_i = d/\cos \theta_i \quad (3)$$

where $d$ indicates the actual thickness. The apparent birefringence $\Delta n_i$ becomes:

$$\Delta n_i = (n_o - n_e)\sin^2\theta_i \quad (4)$$

Therefore, the retardation for the permeating light at $\theta_i$ is represented by:

$$\Gamma_i = 2 d(n_o - n_e)\tan \theta_i \sin \theta_i \quad (5)$$

That is, the value of the retardation $\gamma$ by the variation of the birefringence for the transmitted light at the angle of oblique incidence $\theta_i$ is expressed by Eq. (5).

Now consider the condition of selection for the uniaxial negative crystal which can compensate the retardation attendant upon oblique incidence. Let $n_o'$ and $n_e'$ be the refractive indices of the conjugate crystal, and $d'$ be the thickness thereof. The angle of refraction $\theta_i'$ of light beams incident at an angle of $\theta_o$ to the normal of a conjugate crystal plate, which is obtained by cutting the upper and lower principal planes of the conjugate crystal normally to its optical axis and polishing them, has the following relation:

$$\sin \theta_o = n_o \sin \theta_i' \quad (6)$$

From the relations of Eqs. (2) and (6), $$\sin \theta_i' = \frac{1.85}{n_o}\sin \theta_i. \quad (7)$$

The retardation $R_i$ for the obliquely transmitted light at $\theta_i$ becomes, similarly to Eq. (5), as follows:

$$R_i = d'(n_o' - n_e') \tan \theta_i \sin \theta_i \quad (8)$$

The condition $R_i'$ at which the retardation due to the oblique incidence can be compensated by the use of the conjugate crystal is $R_i' = -R_i$, that is:

$$2 d(n_e - n_o) \sin \theta_i \tan \theta_i = d'(n_o' - n_e') \sin \theta_i \tan \theta_i \quad (9)$$

Here, examples of the crystal conjugate to $Gd_2(MoO_4)_3$ are listed in Table 2.

TABLE 2

| Uniaxial Conjugate Crystals to Biaxial Crystal | | | |
|---|---|---|---|
| Name of Substance | Crystal System | $\omega D$ | $\epsilon D$ |
| $Na_2SiF_6$ | Hex. | 1.312 | 1.309 |
| $2NaF.AlF_3$ | Tetr. | 1.349 | 1.342 |
| $(NH_4)_2SiF_6$ | Hex. | 1.406 | 1.391 |
| $CuSiF_6.6H_2O$ | Trig. | 1.4092 | 1.4080 |
| $CaCl_2.6H_2O$ | Trig. | 1.417 | 1.393 |
| $KAl(SO_4)_2.12H_2O$ | Hex. (?) | 1.456 | 1.429 |
| $3CaO.Al_2O_3.3CaSO_4.31H_2O$ | Hex. | 1.464 | 1.458 |
| $(NH_4)_3ScF_6$ | Tetr. | <1.47 | — |
| $BeSO_4.4H_2O$ | Tetr. | 1.4720 | 1.4395 |
| $LiKSO_4$ | Hex. | 1.4723 | 1.4717 |
| $BeO.Be(C_2H_5SO_4).4H_2O$ | Tetr. | 1.473 | 1.435 |
| $K_2TiF_6$ | Trig. | 1.475 | — |
| $11Na_2O.9SO_2.2CO_2.KCl$ | Hex. | 1.481 | 1.461 |
| $La(C_2H_5SO_4)_6.18H_2O$ | Hex. | 1.482 | 1.473 |
| $Ce(C_2H_5SC_4)_6.18H_2O$ | Hex. | 1.482 | 1.474 |
| $Pr(C_2H_5SO_4)_6.18H_2O$ | Hex. | 1.486 | 1.479 |
| $Nd(C_2H_5SO_4)_6.18H_2O$ | Hex. | 1.487 | 1.479 |
| $SiO_2(\beta\text{-Cristobalite})$ | Tetr. | 1.487 | 1.484 |
| $6CaO.Al_2O_3.3SO_2.33H_2O$ | Hex. | 1.488 | 1.474 |
| $Er(C_2H_5SO_4)_6.18H_2O$ | Hex. | 1.490 | 1.480 |
| $Sm(C_2H_5SO_4)_6.18H_2O$ | Hex. | 1.490 | 1.481 |
| $Gd(C_2H_5SO_4)_6.18H_2O$ | Hex. | 1.490 | 1.482 |
| $Na_2SO_4.MgSO_4.25H_2O$ | Tetr. | 1.490 | 1.471 |
| $Y(C_2H_5SO_4)_6.18H_2O$ | Hex. | 1.493 | 1.480 |
| $Eu(C_2H_5SO_4)_6.18H_2O$ | Hex. | 1.494 | 1.484 |
| $Dy(C_2H_5SO_4)_6.18H_2O$ | Hex. | 1.495 | 1.480 |
| $(NH_4)_3UO_2F_5$ | Tetr. | 1.495 | 1.490 |
| $CoSO_4.6H_2O$ | Tetr. | 1.495 | 1.460 |
| $CaO.Al_2O_3.3SiO_2.5H_2O$ | Trig. | 1.496 | 1.491 |
| $C_{10}H_{20}O$ (1-x-Menthol) | — | 1.497 | 1.476 |
| $C_3H_{12}O_3N_6$ (Guanidine-carbonate) | Tetr. | 1.496 | 1.486 |
| $Sr(OH)_2.8H_2O$ | Tetr. | 1.499 | 1.476 |
| $3CaO.A_{12}O_3.CaSO_4.12H_2O$ | Hex. | 1.504 | 1.488 |
| $3CaO.CO_2.SO_3.SiO_2.15H_2O$ | Hex. | 1.507 | 1.468 |
| $2MgO.MgF_2.3CaF_2$ | Hex. | 1.509 | 1.486 |
| $KH_2PO_4$ | Tetr. | 1.5095 | 1.4684 |
| $NiSO_4.6H_2O$ | Tetr. | 1.5109 | 1.4873 |
| $6MgO.Al_2O_3.CO_2.12H_2O$ | Hex. | 1.512 | 1.498 |
| $CaCl_2.2MgCl_2.12H_2O$ | Trig. | 1.520 | 1.512 |
| $K_3Cu(CN)_4$ | Trig. | 1.5215 | — |

TABLE 2-continued

| | Uniaxial Conjugate Crystals to Biaxial Crystal | | |
|---|---|---|---|
| Name of Substance | Crystal System | ωD | εD |
| $Mg_2Al_5SiO_{18}$ α (α-phase) | — | 1.522 | 1.519 |
| $3Mg(NO_3)_2.2La(NO_3)_3.24H_2O$ | Trig. | 1.5220 | 1.5150 |
| $NH_4H_2PO_4$ | Tetr. | 1.5246 | 1.4792 |
| $3Mg(NO_3)_2.2Ce(NO_3)_3.24H_2O$ | Trig. | 1.5249 | 1.5176 |
| $3Mg(NO_3)_2.2Pr(NO_3)_x.24H_2O$ | Trig. | 1.5255 | 1.5182 |
| $3Mg(NO_3)_2.2Nd(NO_3)_3.24H_2O$ | Trig. | 1.5266 | 1.5192 |
| $Ca_2Al_2O_5.12H_2O$ | Hex. | 1.527 | 1.505 |
| $Mg_2Al_5Si_5O_{13}$ α (α-phase) | — | 1.528 | 1.524 |
| $3CaO.Al_2O_3.CaSO_4.6H_2O$ | Hex. (?) | 1.52935 | 1.51027 |
| $ZnSeO_4.6H_2O$ | Tetr. | 1.5291 | 1.5039 |
| $SrS_2O_6.4H_2O$ | Trig. | 1.5296 | 1.5252 |
| $(C_2H_4O)_4$ (Metaldehyde) | Tetr. | 1.530 | 1.430 |
| $RbAlSiO_4$ | Hex. | 1.530 | 1.526 |
| $K_3CO_3.CaCO_3$ | Hex. | 1.530 | 1.48 ± |
| $LiAlSiO_4$ | Hex. | 1.531 | — |
| $K_2O.4CaO.2Al_2O_3.24SiO_2H_2O$ | Hex. | 1.532 | 1.529 |
| $KAlSiO_4$ (β-phase) | Hex. | 1.532 | 1.527 |
| $Ba(ClO_4)_2.3H_2O$ | Hex. | 1.5330 | 1.5323 |
| $6ZnO.3Al_2O_3.2SO_3.18H_2O$ | Hex. | 1.534 | 1.514 |
| $SrCl_2.6H_2O$ | Rhomb. | 1.5364 | 1.4866 |
| $K_2O.8CaO.16SiO_2.16H_2O$ | Tetr. | 1.537 | 1.535 |
| $NaAlSiO_4$ (β-phase or low temp. phase) | Hex. | 1.537 | 1.533 |
| $Ca_3Al_2O_4.8H_2O$ | Hex. | 1.538 | 1.520 |
| $NaLiCO_3$ | Hex. | 1.538 | 1.406 |
| $Al_2O_3.C_{12}O_3.18H_2O$ (Mellite) | Tetr. | 1.539 | 1.511 |
| $ZnCl_2.6NH_3$ | Hex. | 1.539 | 1.530 (?) |
| $NiSeO_4.6H_2O$ | Tetr. | 1.5393 | 1.5125 |
| $CH_3CONH_2$ (Acetamide) | Hex. | 1.54 | 1.46 |
| $6MgO.Fe_2O_3.CO_2.12H_2O$ | Hex. | 1.540 | 1.510 |
| $Na_2O.Al_2O_3.2SiO_2$ | Hex. | 1.542 | 1.538 |
| $6MgO.Cr_2O_3.CO_2.12H_2O$ | Hex. | 1.542 | 1.516 |
| $Li_2O.Al_2O_3.2SiO_2$ | Hex. | 1.545 | — |
| $(CH_2OHCHOH)_2$ (di-Erythritol) | Tetr. | 1.544 | 1.521 |
| $K_2SO_4.Al_2(SO_4)_3$ | Hex. | 1.545 | 1.533 ± |
| $Na_2CO_2.CaCO_3$ | Hex. | 1.547 | 1.504 |
| $K_3CaSi_{10}O_{25}$ | Hex. | 1.548 | 1.537 |
| $CaS_2O_6.4H_2O$ | Trig. | 1.5496 | 1.54 ± |
| $3NaAlSiO_4.CaCO_3$ | Hex. | 1.550 | 1.519 |
| $Co(ClO_4)_2.6H_2O$ | Hex. | 1.55 ± | — |
| $Ni(ClO_4)_2.6H_2O$ | Hex. | 1.55 ± | — |
| $3NaAlSiO_4.CaCO_3$ | Hex. | 1.550 | 1.519 |
| $3CaO.Al_2O_3.CaCl_2.10H_2O$ | Hex. | 1.550 | 1.535 |
| $CaS_2O_6.4H_2O$ | Trig. | 1.5516 | 1.5414 |
| $C_4H_xO_2Cl_2$ (Dichlorobutyleneglycol) | — | 1.554 | 1.515 |
| $HfOCl_2.8H_2O$ | — | 1.557 | 1.543 |
| $C_5H_{12}O_4$ (pentaerythritol) | Tetr. | 1.559 | 1.548 |
| $AlCl_3.6H_2O$ | Trig. | 1.560 | 1.507 |
| $4AlCl_3.3Al_2O_3.3SO_3.36H_2O$ | Trig. | 1.560 | 1.495 |
| $ZrOCl_2.8H_2O$ | Tetr. | 1.563 | 1.552 |
| $Na_2SO_3$ | Hex. | 1.565 | 1.515 |
| $3CaO.CaF_2.3SiO_2.2H_2O$ | Trig. | 1.565 | 1.560 |
| $FeCl_2$ | Hex. | 1.567 | — |
| $KH_2AsO_4$ | Tetr. | 1.5674 | 1.5179 |
| $Ca(OH)_2$ | Hex. | 1.574 | 1.545 |
| $3MnO.4SiO_2.4H_2O$ | Hex. | 1.576 | 1.546 |
| $NH_4H_2AsO_4$ | Tetr. | 1.5766 | 1.5217 |
| $C_{34}H_{50}O_2$ (Cholesterolbenzoate) | — | 1.579 | 1.540 |
| $NaH(UO_2)_2P_2O_x.73H_2O$ | — | 1.580 ± | — |
| $3BeO.Al_2O_3.6SiO_2$ | Hex. | 1.580 | 1.574 |
| $C_{11}H_{11}ON_2Br$ (4-Bromoantipyrine) | — | 1.581 | 1.493 |
| $NaNO_3$ | Trig. | 1.5874 | 1.3361 |
| $2NiO_2.3SiO_2.2H_2O$ | Hex. | 1.59 ± | 1.56 |
| $K_2CO_3.MgCO_3$ | Hex. | 1.597 | 1.47 |
| $Cu(UO_2)_2P_2O_x.8H_2O$ | (?(")) | 1.598 | 1.586 |
| $Ca(UO_2)_2P_2O_x.7H_2O$ | Tetr. | 1.600 | 1.590 |
| $6CaO.Al_2O_3.2P_2O_5.5H_2O$ | Hex. (?) | 1.601 | 1.591 |
| $Cu(UO_2)_2P_2O_x.6H_2O$ | Tetr. (?) | 1.608 | — |
| $PtCl_2.4NH_3.n H_2O$ | Tetr. | 1.612 | 1.607 |
| $2CaO.2BeO.3SiO_2.NaF$ | Tetr. | 1.612 | 1.593 |
| $(Ce_3La_3Dy)F_3$ | Hex. | 1.613 | 1.607 |
| $Ba(UO_2)_2P_2O_x.6H_2O$ | Tetr. (?) | 1.613 | 1.604 |
| $(NH_4)_4Fe(CN)_6.2NH_4Cl.3H_2O$ | Trig. | 1.6198 | 1.5922 |
| $7CaO.2P_2O_5.CO_2.0.5H_2O$ | Hex. | 1.620 ± | 1.609 |
| $Sr_5F(PO_4)_3$ | Hex. | 1.621 | 1.619 |
| $BaO.FeO.4SiO_2$ | Tetr. | 1.621 | 1.619 |
| $Na_2O.3CaO.P_2O_3$ | Hex. (?) | 1.623 | 1.620 |
| $3UO_3.As_2O_5.12H_2O$ | Tetr. (?) | 1.627 | 1.582 |
| $8MnO.7SiO_2.5H_2O$ | — | 1.632 | 1.602 |
| $Ca_5F(PO_4)_3$ | Hex. | 1.6325 | 1.629 ± |
| $C_6H_4(OH)_2$ (Hydroquinone) | Hex. | 1.633 | 1.626 |
| $10CaO.3P_2O_5$ | Hex. | 1.633 | 1.629 |
| $3Ca_3P_2O_x.CaCO_3$ | Hex. | 1.635 | 1.626 |
| $CaCuSi_4O_{10}$ | Tetr. | 1.6354 | 1.6053 |
| $2KCl.CuCl_2.2H_2O$ | Tetr. | 1.637 | 1.615 |

TABLE 2-continued

| | Uniaxial Conjugate Crystals to Biaxial Crystal | | |
|---|---|---|---|
| Name of Substance | Crystal System | ωD | εD |
| CaO.CaCl$_2$ | Hex. | 1.638 | 1.634 |
| BaF$_2$.BaCl$_2$ | Tetr. | 1.640 | 1.633 |
| Al$_2$O$_3$.B$_2$O$_3$ | Hex. | 1.640 | — |
| Ca$_5$ClP$_3$O$_{12}$ | Hex. | 1.642 | 1.637 |
| CuO.2UO$_3$.As$_2$O$_5$.8H$_2$O (?) | Tetr. | 1.643 | 1.623 |
| 3Sr$_3$P$_2$O$_3$.SrCO$_3$ | Hex. | 1.644 | 1.638 |
| Hg(CN)$_2$ | Tetr. | 1.645 | 1.492 |
| C$_6$H$_5$CNBrCN (Bromobenzyl-cyanide) | — | 1.646 | 1.642 |
| 2KCl.CuCl$_2$ | Tetr. | 1.647 | 1.612 |
| 10MgO.6B$_2$O$_3$.3H$_2$O | — | 1.650 | 1.575 |
| SrCl$_2$.SrF$_2$ | Tetr. | 1.651 | 1.627 |
| Fe$_2$O$_n$.P$_2$O$_5$.6H$_2$O | — | 1.655 | 1.645 |
| CaCO$_3$ α (Calcite) | Trig. | 1.6585 | 1.6864 |
| Al$_2$O$_3$ | Hex. | 1.67–8 | 1.63–5 |
| PtCl$_2$.2NH$_3$.(PtCl$_2$.4NH$_2$) | Tetr. | 1.666 | 1.658 |
| Ca$_5$ClP$_3$O$_{12}$ | Hex. | 1.6668 | 1.666 ± |
| BaF$_2$.3Ba$_3$P$_2$O$_n$ | Hex. | 1.669 | 1.665 |
| Ca$_2$Al$_2$SiO$_7$ | Tetr. | 1.669 | 1.658 |
| (NH$_4$)$_2$CuCl$_4$.2H$_2$O | Tetr. | 1.670 | 1.645 |
| Ca$_2$FeSi$_2$O$_7$ | Tetr. | 1.670 | 1.658 |
| MgCl$_2$ | Hex. | 1.675 | 1.59 |
| 4(NH$_4$)$_2$S$_2$O$_n$.AgBr.NH$_4$Br | Tetr. | 1.6769 | 1.6294 |
| V$_2$O$_4$.CaO.P$_2$O$_5$.5H$_2$O | Tetr. | 1.680 | 1.655 |
| BaO.2CaO.3SiO$_2$ | Hex. (?) | 1.681 | 1.668 |
| CaO.MgO.2CO$_2$ | Trig. | 1.681 | 1.500 |
| 3Ba$_3$P$_2$O$_8$.BaCO$_3$ | Hex. | 1.691 | 1.683 |
| AlClO.6CuO.9H$_2$O | Trig. | 1.694 | 1.641 |
| C$_6$H$_{12}$O$_4$N$_2$S$_2$ (2-Cystine) | Hex. | 1.700 | 1.640 |
| MgCO$_3$ | Trig. | 1.700 | 1.509 |
| Ba$_5$ClP$_3$O$_{12}$ | Hex. | 1.701 | 1.699 |
| 12MnO.9SiO$_2$.As$_2$O$_3$.7H$_2$O | Hex. (?) | 1.704 | 1.679 |
| 9CaO.3As$_2$O$_5$.CaF$_2$ | Hex. | 1.706 | 1.698 |
| Na$_4$Zr$_2$Si$_3$O$_{12}$ | Trig. | 1.715 | 1.692 |
| C$_6$H$_5$COC$_6$H$_4$CH$_3$ (Phenylp-tolylketone) | — | 1.717 | 1.563 |
| MnO.H$_2$O | Trig. | 1.723 | 1.681 |
| Ca-Al-silicate | — | 1.730 | 1.726 |
| LiNO$_3$ | Trig. | 1.735 | 1.435 |
| CuCl$_2$.2NH$_4$Cl.2H$_2$O | Tetr. | 1.744 | 1.724 |
| Ce$_2$O$_3$.3CO$_2$.BaF$_2$ | Hex. | 1.760 | 1.577 |
| Al$_2$O$_3$ | Trig. | 1.768 | 1.760 |
| Fe$_2$(SO$_4$)$_3$ (Stable > 130°C) | Rhomb. | 1.770 | 1.760 |
| Na$_2$O.2Al$_2$O$_2$.Sb$_2$O$_3$ | Hex. | 1.772 | 1.770 |
| BaAg$_2$Cs$_3$(NCS)$_7$ | Tetr. | 1.7761 | 1.6788 |
| Cs$_3$TI$_2$Cl$_3$ | Hex. | 1.784 | 1.774 |
| K$_2$PtI$_2$(NO$_2$)$_2$.2H$_2$O | Tetr. | 1.7909 | 1.6527 |
| 7(Fe,Mg)O.3Fe$_2$O$_3$.4SiO$_2$.8H$_2$O | Trig. (?) | 1.80 | — |
| Fe$_2$O$_2$.WO$_3$.6H$_2$O | Hex. | 1.80 | 1.72 |
| CHI$_3$ (Iodoform) | Hex. | 1.800 | 1.750 |
| BaCu$_2$Cs$_3$(NCS)$_7$ | Tetr. | 1.8013 | 1.6882 |
| Ag$_2$HPO$_4$ | Trig. | 1.8036 | 1.7983 |
| 2(Pb$_3$Mg)O.3Fe$_2$O$_3$.4SiO$_2$.8H$_2$O | Hex. | 1.815 | 1.761 |
| 3Fe$_2$O$_3$.4SO$_3$.9H$_2$O | Rhomb. | 1.816 | 1.728 |
| MnCO$_3$ | Trig. | 1.817 | 1.597 |
| ZnCO$_3$ | Trig. | 1.818 | 1.618 |
| K$_2$O.3FeO$_3$.4SO$_3$.6H$_2$O | Trig. | 1.820 | 1.715 |
| NaYSiO$_4$ | Hex. | 1.832 | 1.804 |
| Na$_2$O.3Fe$_2$O$_3$.4SO$_3$.6H$_2$O | Trig. | 1.832 | 1.750 |
| CuO.PbO.Fe$_2$O$_3$.4H$_2$O | Hex. | 1.85 | — |
| SrCu$_2$Cs$_3$(NCS)$_7$ | Tetr. | 1.8535 | 1.6932 |
| CoCO$_3$ | Hex. | 1.855 | 1.60 |
| NaLaSiO$_4$ | Hex. | 1.867 | 1.840 |
| KLaSiO$_4$ | Hex. | 1.867 | 1.840 |
| 6CaO.4Fe$_2$O$_3$.3As$_2$O$_5$.9H$_2$O (?) | — | 1.870 | 1.792 |
| 6CaO.3Fe$_2$O$_3$.2As$_2$O$_5$.9H$_2$O | Hex. | 1.87 | 1.85 |
| LiLaSiO$_4$ | Hex. | 1.870 | 1.843 |
| FeCO$_3$ | Trig. | 1.875 | 1.633 |
| PbO.3Fe$_2$O$_3$.4SO$_3$.6H$_2$O | Trig. | 1.875 | 1.784 |
| CaLa$_2$Si$_3$O$_9$ | Hex. | 1.880 | 1.874 |
| NaPrSiO$_4$ | Hex. | 1.889 | 1.861 |
| NaNdSiO$_4$ | Hex. | 1.889 | 1.861 |
| NaSmSiO$_4$ | Hex. | 1.898 | 1.867 |
| Ag$_2$O.3Fe$_2$O$_3$.4SO$_3$.6H$_2$O | Hex. | 1.898 | 1.815 |
| CaNd$_2$Si$_2$O$_3$ | Hex. | 1.903 | 1.897 |
| 2PbO.3FeO$_3$.P$_2$O$_5$.2SO$_3$.6H$_2$O | Trig. | 1.93 | — |
| Pb$_3$(PO$_4$)$_2$ | Hex. | 1.9702 | 1.9364 |
| C (Graphite) | Trig. | 2.0 ± | — |
| Pr$_2$(MoO$_4$)$_3$ | Tetr. | 2.006 ± | — |
| 3MnO.As$_2$O$_3$ | Trig. | 2.01 | 1.99 |
| Bi$_2$O$_3$.3H$_2$O (?) | Hex. | 2.01 | 1.82 |
| Nd$_2$(MoO$_4$)$_3$ | Tetr. | 2.023 | 2.021 |
| 5PbCl$_2$.4CuO.6H$_2$O | Tetr. | 2.03 | 2.00 |
| Ce$_2$(MoO$_4$)$_3$ (Stable > 900°C) | Tetr. | 2.04 | 2.028 |
| 4PbCl$_2$.4CuO.5H$_2$O | Tetr. | 2.041 | 1.926 |
| 9PbCl$_2$.8CuO.3AgCl.9H$_2$O | Tetr. | 2.05 | 2.03 |

TABLE 2-continued

| | Uniaxial Conjugate Crystals to Biaxial Crystal | | |
|---|---|---|---|
| Name of Substance | Crystal System | ωD | εD |
| $3PbO.2SiO_2$ | Trig. | 2.07 | 2.05 |
| $Pb_3(OH)_2(CO_3)_2$ (White lead pigment) | Hex. | 2.09 | 1.94 |
| $Bi_2O_3.CO_2$ | — | 2.13 | 1.94 |
| $H_2K_2Te_2O_{10}.2H_2O$ | Trig. | 2.142 | 2.060 |
| $9PbO.3As_2O_5.PbCl_2$ | Hex. | 2.16 | 2.13 |
| $PbO_2$ | Tetr. | 2.229 | — |
| $2ZnO.2Mn_2O_3.H_2O$ | Tetr. | 2.26 ± | 2.10 |
| $PbO.WO_3$ | Tetr. | 2.269 | 2.182 |
| $9PbO.3As_2O_3.PbCl_2$ | Hex. | 2.295 | 2.285 |
| $(Mg_3Fe)O.TiO_2$ | Trig. | 2.31 | 1.95 |
| $ZnO.Mn_2O_3$ | Tetr. | 2.34 | 2.14 |
| $9PbO.3V_2O_5.PbCl_2$ | Hex. | 2.354 | 2.299 |
| $PbO.MoO_3$ | Tetr. | 2.40 | 2.28 |
| $Mn_3O_4$ | Tetr. | 2.46 Li | 2.15 Li |
| $MnO.TiO_2$ | Trig. | 2.481 | 2.210 |
| $TiO_2$ | Tetr. | 2.554 | 2.493 |
| $CaO.Fe_2O_3$ | — | 2.58 | 2.43 |
| $AsI_3$ | Trig. | 2.59 ± | 2.23 ± |
| $AgAsS_2$ (Low temp. phase) | Trig. | 2.6 Li | — |
| $PbO$ | Tetr. | 2.665 | 2.535 |
| $HgI_2$ | Tetr. | 2.748 | 2.455 |
| $SbI_3$ (Low temp. phase) | Trig. | 2.78 ± Li | 2.36 ± Li |
| $3Ag_2S.As_2S_3$ | Trig. | 3.088 | 2.792 |
| $Fe_2O_3$ | Hex. | 3.22 | 2.94 |

In the above Table 2, ωD represents the refractive index for ordinary rays as measured with Na D-line, while ε D indicates the refractive index for extraordinary rays as measured with the same line. Hex. is short for the hexagonal system, Tetr. for the tetragonal system, Rhomb. for the rhombohedral system, and Trig. the trigonal system.

As will be understood from the above description, where, in the element employing the electro-optic crystal plate which has the principal planes normal to the bisector of the two optical axes of the biaxial birefringent crystal, the optical anisotropy is to be nullified as in, for example, the "off" state of an optical shutter element, a construction as shown in FIG. 2 may be adopted in order to always neglect the optical anisotropy and to eliminate leakage of light not only for the normally incident light but also for light incident in every direction. That is, quarter-wave plates $3_1$ and $3_2$ of the biaxial birefringent crystal are arranged in cascade to the incident light in a phase subtracting manner, to convert biaxial anistropy into uniaxial anisotropy, and a crystal plate 6 having major surfaces normal to the optical axis of the uniaxial crystal in conjugate relationship is arranged in cascade to the quarter-wave plates. In particular, when the refractive index of the conjugate crystal plate matches the value of the equivalent uniaxial refractive index of the biaxial crystal plates arranged in the phase subtracting manner, the anisotropy disappears and the isotropy is established in all the directions.

Where, in the element employing the birefringent crystal, the variations of retardation dependent upon the direction of incidence are desired to be reduced as in, for example, the "on" state of the optical shutter element for such element bestowing a predetermined retardation on transmitted light as a phase retarder and color modulator, the uniaxial crystal in conjugate relationship may be combined as in the foregoing case. In this case, however, the retardation for normally incident light on the biaxial birefringent crystal need not be zero, unlike the previous example. Therefore, only one biaxial birefringent crystal plate suffices for, e.g., the phase retarder. In the optical shutter element, two λ/4 plates of the biaxial birefringent crystal may be arranged at phase adding positions, so that the retardation may correspond to a half-wavelength plate. In a color modulator, the values of retardations of two or more birefringent crystals plates may correspond to the required interference colors. In this manner, the number and thickness of the birefringent crystal plates differ in dependence on the use. In any case, the change of the value of retardation as based on the oblique incidence increases with the overall thickness of the refractive crystal, and hence, the thickness of the conjugate uniaxial crystal may be determined in consideration thereof. That is, for a plurality of biaxial birefringent crystal plates as well as for a single plate, the thickness of the conjugate crystal may be determined relative to the sum of the thicknesses of all the plates in the event that the plates are made of the same substance. For example, when the indices of birefringence of the biaxial birefringent crystal plates are converted into an equivalent uniaxial value and the conjugate crystal of a refractive index matching therewith is used, the thickness of the conjugate crystal may be selected at the same thickness as that of the entire biaxial crystal.

Description will be made of embodiments of the light control element which have the viewing angle widened for obliquely incident light and which are prepared using conjugate crystals listed in Table 2.

Embodiment 1

A C-plate was cut at such a high precision that the deviation from the c-plane of a single $Gd_2(MoO_4)_3$ crystal fell within 30 seconds. With reference to the orientation of the cutting surface and flat thereto, the C-plate was precisely polished into a transparent plate 387 ± 0.5 μthick.

Since the crystal was a single domain crystal before processing, the C-plate obtained was of the single domain type. It became a highly-precise circular polarization plate for He - Ne laser light having wavelength of 6328 A. However, when the incident light was oblique even slightly or it was not collimated light, an elliptically polarized component arose. Since the equivalent uniaxial indices of refraction of $Gd_2(MoO_4)_3$ are $n_e =$ 1.889 and $n_o = 1.836$, the matching refractive indices are $n_o = 1.836$ and $n_e = 1.783$. A C-plate of the single crystal of the optimum substance $CHI_3$ selected from Table 2 was cut in like manner to the $Gd_2(MoO_4)_3$, and was optically polished to a thickness of $390\mu$. It was affixed to the foregoing circular polarization plate of $Gd_2(MoO_4)_3$. Antireflection films of MgF were provided on the opposite major surfaces of the plates. A circular polarization plate thus made, produced circular polarization not only when the incident light was normal but also when the light incident on crystal plates was inclined by about 30°.

Embodiment 2

Two $\lambda/4$ plates of $Gd_2(MoO_4)_3$ each processed in the same was as in Embodiment 1, were prepared. On the surfaces of one of the plates, electrodes of low resistance and high light permeability were provided by sputtering $In_2O_3$ - $SnO_2$ series ceramics. The two $\lambda/4$ plates were diagonally inserted between two polarizers disposed in an orthogonal arrangement. By illuminating the element as to concentrate He-Ne laser light on the surface by a lens, a conoscopic figure was made. The conoscopic figure obtained is shown in FIG. 3. This and the other conoscopic figures shown in FIGS. 4 and 6 are interference patterns of a double refractive crystal plate which is placed between crossed polarizers. Circular lines from the center line to the outer line, as in FIGS. 3 and 4, show first, second and third interference effects, respectively. The lines crossing the circular lines show the principal axis of the refractive indices. Subsequently, a voltage of about 100 volts was applied to the $\lambda/4$ plate provided with the electrodes, to reverse the polarization. At this time, the conoscopic figure changed as in FIG. 4.

FIG. 3 is the conoscopic figure of a $\lambda/2$ plate and corresponds to the open state of an optical shutter, while FIG. 4 corresponds to the closed state of the optical shutter. As will be apparent from FIG. 4, the light normally incident on the optical shutter is intercepted, but the light obliquely incident leaks out. The function of the optical shutter is therefore degraded for the incident light of wide view angle. The conoscopic figure in FIG. 4 resembles that of a uniaxial crystal well. Next, the compensation for the oblique incidence was made using a conjugate compensator.

Similar to Embodiment 1, a single $CHI_3$ crystal was polished to a thickness of $780 \mu$, and the plate obtained was arranged in superposition with the $\lambda/4$ plates of $Gd_2(MoO_4)_3$. At this time, the conoscopic figure in FIG. 3 disappeared, and the entire screen became bright. When the shutter was closed, the figure in FIG. 4 also disappeared, and the screen became dark uniformly over its entire surface.

It was revealed that the compensation could be perfectly made for oblique incidence. Then, as shown in FIG. 5, antireflection films 7, 8 and 9 were respectively disposed on the $\lambda/4$ plate $3_1$ of $Gd_2(MoO_4)_3$ provided with the electrodes 4, the $\lambda/4$ plate $3_2$ provided with no electrode and the conjugate crystal plate 6 of $CHI_3$. The plates $3_1$, $3_2$ and 6 were respectively fixed to stands 10, 11 and 12, and were inserted between the polarizers 1 and 2 orthogonally arranged. They were accommodated in a case 13. The electrodes 4 were connected to terminals 16 and 17 by lead wires 14 and 15. Thus, an optical shutter was constructed. With this optical shutter, the He - Ne laser light could be turned "on" and "off" at a light blocking ratio of about $10^4$. This light blocking ratio did not considerably decrease even for the obliquely incident light, and it was not difficult to keep the light blocking ratio at above $10^3$. Similar to Embodiment 2, an optical shutter for white light could be fabricated.

The thickness of the $\lambda/4$ plate of $Gd_2(MoO_4)_3$ for white light or natural light is 320 $\mu$. Therefore, when the optical shutter was constructed by polishing $CHI_3$ to a thickness of 650 $\mu$, a very good result was obtained, and the prospect of practically using the element in a camera etc. could be seen.

Further, study was made by employing $CoCO_3$, $MnCO_3$, $ZnCO_3$, $NaYSiO_4$, $NaLaSiO_4$, $KLaSiO_4$, $LiLaSiO_4$ etc. as the conjugate crystals, and good prospects were seen for widening the viewing angle on all the substances. Since, however, no single crystal colorless and transparent, optically homogeneous and large in size could be obtained for these conjugate crystals, satisfactory practical use was impossible.

For reference purposes, description will be made of a case where study was made with a crystal of $KH_2PO_4$ whose refractive index for ordinary rays is $n_o = 1.509$, considerably smaller than the refractive index of $Gd_2(MoO_4)_3$, $n_e = 1.85$, and which is, accordingly, a considerably poor match in contrast to the above crystals. The method of constructing the optical shutter was the same as in the foregoing, and is omitted here. The thickness of $KH_2PO_4$ for He - Ne laser was 680 $\mu$, and a conoscopic figure at the closure is shown in FIG. 6. The wide view angle-compensation was about 7°.

Embodiment 3

As is shown in FIG. 7, $Gd_2(MoO_4)_3$ C-plates $3_1$ and $3_2$ each having an area of 10 mm × 10 mm and respectively having thicknesses of 195 $\mu$ and 210 $\mu$ were respectively coated with transparent electrodes $4_1$ and $4_2$ by the same method as in Embodiment 2. Lead wires 18,18' and 19,19' were connected to the respective electrodes. The resultant C-plates $3_1$ and $3_2$ were respectively fixed to supporting plates 10 and 12, a mylar film 20 of a thickness of $10\mu$ and a $KH_2PO_4$ C-plate 6 of a thickness of $650\mu$ were affixed in a manner to be held therebetween, and orthogonal polarizers 1 and 2 were bonded to a case 13. The mylar film provides a double refraction function, and hence, produces an interference color in connection with the other double refractive crystals between the polarizers. The crystal plates were put into the case 13 at diagonal positions, and were molded. The lead wires 18,18' and 19,19' were respectively connected to terminals 16,17 and 21,22 of the case. The terminals 16,17,21 and 22 had resistors of 10 k $\Omega$ connected thereto, respectively, and were then grounded to the case 13.

In this way, a color modulator was constructed. When a prior-art color modulator is inclined or viewed with light having a wide angle, the color impurity becomes inferior, and the color changes. In contrast, where the color modulator in FIG. 7 was illuminated at a wide viewing angle defining a solid angle of $\pm 20°$, and the light was projected onto a screen, the entire screen changed to the three primary colors, red, blue and green each having substantially the same hues. Thus, the prospect of practical use into a color modulator for a color TV camera was seen.

It has been described above that, using a uniaxial conjugate crystal for an optical element which has a compensator of $Gd_2(MoO_4)_3$ being biaxial, the change of birefringence for obliquely incident light can be compensated to make the viewing angle of the element wide.

Although all the embodiments have exemplified the use of a $Gd_2(MoO_4)_3$ C-plate as a biaxial electro-optic crystal plate, any other biaxial crystal plate having the electro-optic effect may be used. When a substance having ferroelectricity not simultaneously a ferroelastic property (that is, a substance exhibiting a square hysteresis loop between the applied stress and the arising strain), such as $Tb_2(MoO_4)_3$, $Sm_2(MoO_4)_3$, $Dy_2(MoO_4)_3$, potassium dihydrogen phosphate (KDP) and roshell salt (R-salt), is used for the biaxial electro-optic crystal plate, the crystal plate has features as follows. Once a voltage has been applied to the biaxial electro-optic crystal plate to place it in a predetermined birefringent state, the state is retained without supplying the voltage insofar as a voltage of the opposite polarity is applied. Therefore, the light control element of the foregoing construction has a memory function.

While I have shown and described several embodiments in accordance with the present invention it is understood that the same is not limited thereto but is susceptible of numerous changes and modifications known to a person skilled in the art and I therefore do not wish to be limited to the details shown and described herein but intend to cover all such changes and modifications as are obvious to one of ordinary skill in the art.

What is claimed is:

1. An optical control device comprising:
   first and second biaxial electro-optic crystals, each of which has
      a pair of major surfaces which are normal to a bisector of an angle defined by the two optical axes of the crystal, and
      a thickness providing a retardation equal to that provided by the other biaxial crystal;
   at least one pair of transparent electrodes provided respectively on the pair of major surfaces of at least one of said biaxial crystals, and a respective source of supply voltage connected to each respective pair of electrodes; and
   a uniaxial crystal plate, which is conjugate to said first and second biaxial crystal plates, having a thickness corresponding to the equivalent retardation of said biaxial crystal plate;
   said biaxial crystal plates and said uniaxial crystal plate being disposed optically in cascade with each other.

2. An optical control device according to claim 1, further comprising a pair of crossed polarizers between which said crystals are disposed.

3. An optical control device according to claim 1, wherein said uniaxial crystal plate is made from a material selected from the group consisting of $Na_2SiF_6$, $2NaF \cdot AlF_3$, $(NH_4)_2SiF_6$, $CuSiF_6 \cdot 6H_2O$, $CaCl_2 \cdot 6H_2O$, $KAl(SO_4)_2 \cdot 12H_2O$, $3CaO \cdot Al_2O_3 \cdot 3CaSO_4 \cdot 12H_2O$, $(NH_4)_3ScF_6$, $BeSO_4 \cdot 4H_2O$, $LiKSO_4$, $BeO \cdot Be(C_2H_5SO_4) \cdot 4H_2O$, $K_2TiF_8$, $11Na_2O \cdot 9SO_2 \cdot 2CO_2 \cdot KCl$, $La(C_2H_5SO_4)_6 \cdot 18H_2O$, $Ce(C_2H_5SC_4)_6 \cdot 18H_2O$, $Pr(C_2H_5SO_4)_6 \cdot 18H_2O$, $Nd(C_2H_5SO_4)_6 \cdot 18H_2O$, β-Cristobalite, $6CaO \cdot Al_2O_3 \cdot 3SO_2 \cdot 33H_2O$, $Er(C_2H_5SO_4)_6 \cdot 18H_2O$, $Sm(C_2H_5SO_4)_6 \cdot 18H_2O$, $Gd(C_2H_5SO_4)_6 \cdot 18H_2O$, $Na_2SO_4 \cdot MgSO_4 \cdot 25H_2O$, $Y(C_2H_5SO_4)_6 \cdot 18H_2O$, $Eu(C_2H_5SO_4)_6 \cdot 18H_2O$, $Dy(C_2H_5SO_4)_6 \cdot 18H_2O$, $(NH_4)_3UO_2F_5$, $CoSO_4 \cdot 6H_2O$, $CaO \cdot Al_2O_3 \cdot 3SiO_2 \cdot 5H_2O$, $C_{10}H_{20}O$, $C_3H_{12}O_3N_6$, $Sr(OH)_2 \cdot 8H_2O$, $3CaO \cdot A_{12}O_3 \cdot CaSO_4 \cdot 12H_2O$, $3CaO \cdot CO_2 \cdot SO_3 \cdot SiO_2 \cdot 15H_2O$, $2MgO \cdot MgF_2 \cdot 3CaF_2$, $KH_2PO_4$, $NiSO_4 \cdot 6H_2O$, $6MgO \cdot Al_2O_3 \cdot CO_2 12H_2O$, $CaCl_2 \cdot 2MgCl_2 \cdot 12H_2O$, $K_3Cu(CN)_4$, $Mg_2Al_4Si_5O_{18}$ α (α-phase), $3Mg(NO_3)_2 \cdot 2La(NO_3)_3 \cdot 24H_2O$, $NH_4H_2PO_4$, $3Mg(NO_3)_2 \cdot 2Ce(NO_3)_3 \cdot 24H_2O$, $3Mg(NO_3)_2 \cdot 2Pr(NO_3)_3 \cdot 24H_2O$, $3Mg(NO_3)_2 \cdot 2Nd(NO_3)_3 \cdot 24H_2O$, $Ca_3Al_2O_5 \cdot 12H_2O$, $Mg_2Al_4Si_5O_{13}$ α, $3CaO \cdot Al_2O_3 \cdot CaSO_4 \cdot 6H_2O$, $ZnSeO_4 \cdot 6H_2O$, $SrS_2O_6 \cdot 4H_2O$, Metaldehyde, $PbAlSiO_4$, $K_3CO_3 \cdot CaCO_3$, $LiAlSiO_4$, $K_2O \cdot 4CaO \cdot 2Al_2O_3 \cdot 24SiO_2 \cdot H_2O$, $KAlSiO_4$ (β-phase), $Ba(ClO_4)_2 \cdot 3H_2O$, $6ZnO \cdot 3Al_2O_3 \cdot 2SO_3 \cdot 18H_2O$, $SrCl_2 \cdot 6H_2O$, $K_2O \cdot 8CaO \cdot 16SiO_2 \cdot 16H_2O$, $NaAlSiO_4$ (β-phase or low temperature phase), $Ca_3Al_2O_4 \cdot 8H_2O$, $NaLiCO_3$, $Al_2O_3 \cdot C_{12}O_3 \cdot 18H_2O$, $ZnCl_2 \cdot 6NH_3$, $NiSeO_4 \cdot 6H_2O$, $CH_3CONH_2$, $6MgO \cdot Fe_2O_3 \cdot CO_2 \cdot 12H_2O$, $Na_2O \cdot Al_2O_3 \cdot 2SiO_2$, $6MgO \cdot Cr_2O_3 \cdot CO_2 \cdot 12H_2O$, $Li_2O \cdot Al_2O_3 \cdot 2SiO_2(CH_2OHCHOH)_2$(di-Erythritol), $K_2SO_4 \cdot Al_2(SO_4)_3$, $Na_2CO_3 \cdot CaCO_3$, $K_3CaSi_{10}O_{25}$, $CaS_2O_6 \cdot 4H_2O$, $3NaAlSiO_4 \cdot CaCO_3$, $Co(ClO_4)_2 \cdot 6H_2O$, $Ni(ClO_4)_2 \cdot 6H_2O$, $3NaAlSiO_4 \cdot CaCO_3$, $3CaO \cdot Al_2O_3 \cdot CaCl_2 \cdot 10H_2O$, $CaS_2O_6 \cdot 4H_2O$, $C_4H_6O_2Cl_2$, $HfOCl_2 \cdot 8H_2O$, $C_5H_{12}O_4$, $AlCl_3 \cdot 6H_2O$, $4AlCl_3 \cdot 3Al_2O_3 \cdot 3SO_3 \cdot 36H_2O$, $ZrOCl_2 \cdot 8H_2O$, $Na_2SO_3$, $3CaO \cdot CaF_2 \cdot 3SiO_2 \cdot 2H_2O$ $FeCl_2$, $KH_2AsO_4$, $Ca(OH)_2$, $3MnO \cdot 4SiO_2 \cdot 4H_2O$, $NH_4H_2AsO_4$, Cholesterol-benzoate, $NaH(UO_2)_2P_2O_8 \cdot 73H_2O$, $3BeO \cdot Al_2O_3 \cdot 6SiO_2$, $C_{11}H_{11}ON_2Br$, $NaNO_3$, $2NiO_2 \cdot 3SiO_2 \cdot 2H_2O$, $K_2CO_3 \cdot MgCO_3$, $Cu(UO_2)_2P_2O_8 \cdot 8H_2O$, $Ca(UO_2)_2P_2O_8 \cdot 7H_2O$, $6CaO \cdot Al_2O_3 \cdot 2P_2O_5 \cdot 5H_2O$, $Cu(UO_2)_2P_2O_8 \cdot 6H_2O$, $PtCl_2 \cdot 4NH_3 \cdot n H_2O$, $2CaO \cdot 2BeO \cdot 3SiO_2 \cdot NaF$, $(Ce_3La_3Dy)F_3$, $Ba(UO_2)_2P_2O_8 \cdot 6H_2O$, $(NH_4)_4Fe(CN)_6 \cdot 2NH_4Cl \cdot 3H_2O$, $7CaO \cdot 2P_2O_5 \cdot CO_2 \cdot 0.5H_2O$, $Sr_5F(PO_4)_3$, $BaO \cdot FeO \cdot 4SiO_2$, $Na_2O \cdot 3CaO \cdot P_2O_5$, $3UO_3 \cdot As_2O_5 \cdot 12H_2O$, $8MnO \cdot 7SiO_2 \cdot 5H_2O$, $Ca_5F(PO_4)_3$, Hydroquinone, $10CaO \cdot 3P_2O_5$, $3Ca_3P_2O_5 \cdot CaCO_3$, $CaCuSi_4O_{10}$, $2KCl \cdot CuCl_2 \cdot 2H_2O$, $CaO \cdot CaCl_2$, $BaF_2 \cdot BaCl_2$, $BaF_2 \cdot BaCl_2$, $Al_2O_3 \cdot B_2O_3$, $Ca_5ClP_3O_{12}$, $CuO \cdot 2UO_3 \cdot As_2O_5 \cdot 8H_2O$, $3Sr_3O_2O_3 \cdot SrCO_3$, $HgCN_2$, $C_6H_5CNBrCN$, $2KCl \cdot CuCl_2$, $10MgO \cdot 6B_2O_3 \cdot 3H_2O$, $SrCl_2 \cdot SrF_2$, $Fe_2O_8 \cdot P_2O_5 \cdot 6H_2O$, $CaCO_3$, $Al_2O_3$, $PtCl_2 \cdot 2NH_3 \cdot (PtCl_2 \cdot 4NH_2)$, $Ca_5ClP_3O_{12}$, $BaF_2 \cdot 3Ba_3F_2O_8$, $Ca_2Al_2SiO_7$, $(NH_4)_2CuCl_4 \cdot 2H_2O$, $Ca_2FeSi_2O_7$, $MgCl_2$, $4(NH_4)_2S_2O_8 \cdot AgBr \cdot NH_4BrV_2O_4 \cdot CaO \cdot P_2O_5 \cdot 5H_2O$, $BaO \cdot 2CaO \cdot 3SiO_2$, $CaO \cdot MgO \cdot 2CO_2$, $3Ba_3P_2O_8 \cdot BaCO_3$, $AlClO \cdot 6CuO \cdot 9H_2O$, $C_6H_{12}O_4N_2S_2$, $MgCO_3$, $Ba_5ClP_3O_{12}$, $12MnO \cdot 9SiO_2 \cdot As_2O_3 \cdot 7H_2O$, $9CaO \cdot 3As_2O_5 \cdot CaF_2$, $Na_4Zr_2Si_3O_{12}$, $C_6H_5COC_6H_4CH_3$, $MnO \cdot H_2O$, Ca - Al - silicate, $LiNO_3$, $CuCl_2 \cdot 2NH_4Cl \cdot 2H_2O$, $Ce_2O_3 \cdot 3CO_2 \cdot BaF_2$, $Al_2O_3$, $Fe_2(SO_4)_3$, $Na_2O \cdot 2Al_2O_2 \cdot Sb_2O_5$, $BaAg_2Cs_3(NCS)_7$, $Cs_3Tl_2Cl_3$, $K_2PtI_2(NO_2)_2 \cdot 2H_2O$, $7(Fe_2Mg/O \cdot 3Fe_2O_3 \cdot 4SiO_2 \cdot 8H_2O$, $Fe_2O_2 \cdot WO_3 \cdot 6H_2O$, $CHI_3$, $BaCu_2Cs_3(NCS)_7$, $Ag_2HPO_4$, $2(Pb_3Mg)O \cdot 3Fe_2O_3 \cdot 4SiO_2 \cdot 8H_2O$, $3Fe_2O_3 \cdot 4SO_3 \cdot 9H_2O$, $MnCO_3$, $ZnCO_3$, $K_2O3FeO_3 \cdot 4SO_3 \cdot 6H_2O$, $NaYSiO_4$, $Na_2O \cdot PbO \cdot Fe_2O_3 \cdot 4H_2O$, $SrCu_2Cs_3(NCS)_7$, $CoCO_3$, $NaLaSiO_4$, $KLaSiO_4$, $6CaO \cdot 4Fe_2O_3 \cdot 3As_2O_5 \cdot 9H_2O$, $6CaO \cdot 3Fe_2O_3 \cdot 2As_2O_5 \cdot 9H_2O$, $LiLaSiO_4$, $FeCO_3$, $PbO \cdot 3Fe_2O_3 \cdot 4SO_3 \cdot 6H_2O$, $CaLa_2Si_2O_3$, $NaPrSiO_4$, $NaNdSiO_4$, $NaSmSiO_4$, $Ag_2O \cdot 3Fe_2O_3 \cdot 4SO_3 \cdot 6H_2O$, $CaNd_2Si_2O_3$, $2PbO \cdot 3FeO_3 \cdot P_2O_5 \cdot 2SO_3 \cdot 6H_2O$, $Pb_3(PO_4)_2$, Graphite, $Pr_2(MoO_4)_3$, $3MnO \cdot As_2O_3$, $Bi_2O_3 \cdot 3H_2O$, $Nd_2(MoO_4)_3$, $5PbCl_2 \cdot 4CuO \cdot 6H_2O$, $Ce_2(MnO_4)_3$, $4PbCl_2 \cdot 4CuO \cdot 5H_2O$, $9PbCl_2 \cdot 8CuO \cdot 3AgCl \cdot 9H_2O$, $3PbO \cdot 2SiO_2$, $Pb_3(OH)_2(CO_3)_2$, $Bi_2O_3 \cdot CO_2$, $H_2K_2TeI_6O_{10} \cdot 12H_2O$, $9PbO3As_2O_5 \cdot PbCl_2$, $PbO_2$, $2ZnO \cdot 2Mn_2O_3 \cdot H_2O$, $PbO \cdot WO_3$, $9PbO \cdot 3As_2O_3 \cdot PbCl_2$, $(Mg_3Fe)O \cdot TiO_2$, $ZnO \cdot Mn_2O_3$, $9PbO \cdot 3V_2O_5 \cdot PbCl_2$, $PbO \cdot MoO_3$, $Mn_3O_4$, $MnO \cdot TiO_2$, $TiO_2$, $CaO \cdot Fe_2O_3$, $AsI_3$, $AgAsS_2$ (low temperature phase), $PbO$, $HgI_2$, $SbI_3$ (low temperature phase), $3Ag_2S \cdot As_2S_3$ and $Fe_2O_3$.

4. An optical control devices according to claim 3, wherein each of said first and second biaxial crystals is a $Gd_2(MoO_4)_3$ crystal plate.

5. An optical control device according to claim 3, further comprising a pair of crossed polarizers between which said crystals are disposed.

6. An optical control device according to claim 4, further comprising a pair of crossed polarizers between which said crystals are disposed.

7. An optical control device according to claim 4, wherein each of said $Gd_2(MoO_4)_3$ crystal plates is a quarter-wave plate.

8. An optical control device according to claim 7, further comprising a pair of crossed polarizers between which said crystals are disposed.

9. An optical control device according to claim 1, wherein a respective pair of transparent electrodes is provided on the major surfaces of each of said first and second biaxial crystals.

10. An optical control device according to claim 1, wherein only said first biaxial crystal has electrodes provided on the major surfaces thereof, said biaxial crystals are made of $Gd_2(MoO_4)_3$ and said uniaxial crystal is $CHI_3$.

11. An optical control device according to claim 10, further comprising a pair of crossed polarizers between which said crystals are disposed.

* * * * *